(12) United States Patent
Schnittger et al.

(10) Patent No.: US 9,371,063 B2
(45) Date of Patent: Jun. 21, 2016

(54) COMPRESSED-AIR SUPPLY DEVICE FOR COMMERCIAL VEHICLES

(71) Applicant: KNORR-BREMSE Systeme fuer Nutzfahrzeuge GmbH, Munich (DE)

(72) Inventors: Karsten Schnittger, Munich (DE); Levente Balogh, Szigetszentmiklos (HU); Matyas Krabot, Szigetszentmiklos (HU)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 285 days.

(21) Appl. No.: 13/968,861

(22) Filed: Aug. 16, 2013

(65) Prior Publication Data

US 2013/0333782 A1 Dec. 19, 2013

Related U.S. Application Data

(63) Continuation of application No. PCT/EP2012/052575, filed on Feb. 15, 2012.

(30) Foreign Application Priority Data

Feb. 17, 2011 (DE) .......................... 10 2011 011 634

(51) Int. Cl.
*B60T 13/26* (2006.01)
*B60T 15/02* (2006.01)
(Continued)

(52) U.S. Cl.
CPC ............. *B60T 15/027* (2013.01); *B60T 13/662* (2013.01); *B60T 13/683* (2013.01); *B60T 17/02* (2013.01);
(Continued)

(58) Field of Classification Search
CPC ................. Y10T 137/2587; Y10T 137/86614; Y10T 137/8663; B60T 13/662; B60T 13/683; B60T 17/02; B60T 17/18; B60T 17/22; B60T 15/027
USPC ............................ 137/115.16, 625.64, 625.66
See application file for complete search history.

(56) References Cited

U.S. PATENT DOCUMENTS 3,848,848 A * 11/1974 Di Tirro ........................... 251/31
3,929,381 A * 12/1975 Durling ...................... 303/118.1
(Continued)

FOREIGN PATENT DOCUMENTS

EP 2 140 926 A2 1/2010
GB 2 284 458 A 6/1995

OTHER PUBLICATIONS

International Preliminary Report on Patentability (PCT/IB373), including Written Opinion (PCT/ISA/237) with English translation dated Aug. 21, 2013 (thirteen (13) pages).
(Continued)

*Primary Examiner* — William McCalister
(74) *Attorney, Agent, or Firm* — Crowell & Moring LLP (57) ABSTRACT

A compressed-air supply device for commercial vehicles is provided. The compressed-air supply device may be connected electrically to an electronic control device that may actuate at least one control valve. The control valve has at least one inlet, one ventilating connection and one outlet. The compressed-air supply device has a control line which is connected to the control valve outlet and may be connected to a control inlet of a compressor and/or an inlet of a regeneration valve, has a supply line via which compressed air may be guided to the control valve inlet, and has a ventilating line connected to the control valve ventilating connection. The control valve may be ventilated via the ventilating line, and is configured such that at a predefined opening pressure in the supply line it pneumatically produces a fluid-conducting connection between the inlet and the outlet such that the control line is ventilated.

16 Claims, 2 Drawing Sheets

(51) Int. Cl.
  *B60T 13/66* (2006.01)
  *B60T 13/68* (2006.01)
  *B60T 17/02* (2006.01)
  *B60T 17/18* (2006.01)
  *B60T 17/22* (2006.01)

(52) U.S. Cl.
  CPC .............. *B60T 17/18* (2013.01); *B60T 17/22* (2013.01); *Y10T 137/8663* (2015.04); *Y10T 137/86292* (2015.04); *Y10T 137/86614* (2015.04)

(56) References Cited

U.S. PATENT DOCUMENTS

| | | | | |
|---|---|---|---|---|
| 4,244,186 A * | 1/1981 | Mehren | ........ | B60T 8/4845 60/547.1 |
| 4,400,039 A * | 8/1983 | Ogata | ........ | B60T 11/103 188/16 |
| 4,586,584 A * | 5/1986 | Auman | ........ | B60T 13/263 180/271 |
| 4,763,959 A * | 8/1988 | Vandemotter | ........ | 303/9 |
| 4,773,301 A * | 9/1988 | Shimamura et al. | ........ | 303/114.3 |
| 4,824,178 A * | 4/1989 | Petersen | ........ | B60T 17/22 303/15 |
| 4,877,294 A * | 10/1989 | Kuhn et al. | ........ | 303/9 |
| 4,900,098 A * | 2/1990 | Kuhn et al. | ........ | 303/1 |
| 5,042,883 A * | 8/1991 | McCann et al. | ........ | 303/7 |
| 5,061,015 A * | 10/1991 | Cramer et al. | ........ | 303/7 |
| 5,286,094 A * | 2/1994 | Milner | ........ | 303/7 |
| 5,328,251 A * | 7/1994 | Brearley | ........ | 303/9 |
| 5,342,117 A * | 8/1994 | Price et al. | ........ | 303/3 |
| 5,415,466 A * | 5/1995 | Breen et al. | ........ | 303/7 |
| 5,443,306 A * | 8/1995 | Broome | ........ | 303/3 |
| 5,615,929 A * | 4/1997 | Broome | ........ | 303/7 |
| 5,738,418 A * | 4/1998 | Stumpe et al. | ........ | 303/15 |
| 5,984,425 A * | 11/1999 | Orzal | ........ | B60T 15/041 188/170 |
| 6,048,038 A * | 4/2000 | Zaviska | ........ | B60T 8/326 303/113.1 |
| 6,079,790 A * | 6/2000 | Broome | ........ | B60T 8/00 137/625.64 |
| 6,089,831 A * | 7/2000 | Bruehmann et al. | ........ | 417/282 |
| 6,126,244 A * | 10/2000 | Fries | ........ | 303/3 |
| 6,152,544 A * | 11/2000 | Greaves, Jr. | ........ | B60T 17/223 188/112 R |
| 6,183,052 B1 * | 2/2001 | Harada et al. | ........ | 303/147 |
| 6,286,913 B1 * | 9/2001 | Mazur et al. | ........ | 303/15 |
| 7,284,802 B2 * | 10/2007 | Ziegler et al. | ........ | 303/7 |
| 2003/0094853 A1 * | 5/2003 | Holst et al. | ........ | 303/123 |
| 2006/0175894 A1 * | 8/2006 | Battistella et al. | ........ | 303/7 |
| 2006/0244305 A1 * | 11/2006 | Hilberer | ........ | 303/15 |
| 2007/0246998 A1 * | 10/2007 | Diekmeyer et al. | ........ | 303/9.61 |
| 2008/0007111 A1 * | 1/2008 | Detlefs et al. | ........ | 303/3 |
| 2008/0309154 A1 * | 12/2008 | Hilberer | ........ | 303/15 |
| 2009/0099746 A1 * | 4/2009 | Hilberer | ........ | 701/70 |
| 2009/0184568 A1 * | 7/2009 | Bensch et al. | ........ | 303/115.2 |
| 2009/0189438 A1 * | 7/2009 | Beier et al. | ........ | 303/3 |
| 2009/0195058 A1 | 8/2009 | Jackson et al. | | |
| 2009/0206658 A1 * | 8/2009 | Hilberer | ........ | 307/9.1 |
| 2009/0256416 A1 * | 10/2009 | Bensch et al. | ........ | 303/17 |
| 2009/0309413 A1 * | 12/2009 | Bensch et al. | ........ | 303/20 |
| 2010/0025141 A1 * | 2/2010 | Bensch et al. | ........ | 180/271 |
| 2010/0072810 A1 * | 3/2010 | Bensch et al. | ........ | 303/17 |
| 2010/0078988 A1 * | 4/2010 | Bensch et al. | ........ | 303/3 |
| 2010/0244550 A1 * | 9/2010 | Hilberer | ........ | 303/15 |
| 2010/0252378 A1 * | 10/2010 | Hilberer | ........ | 188/106 F |
| 2010/0304929 A1 * | 12/2010 | Hilberer | ........ | 477/183 |
| 2011/0144855 A1 * | 6/2011 | Herges et al. | ........ | 701/31 |
| 2011/0147141 A1 * | 6/2011 | Schnittger et al. | ........ | 188/152 |
| 2011/0187181 A1 * | 8/2011 | Kaupert | ........ | 303/20 |
| 2011/0273004 A1 * | 11/2011 | Mann et al. | ........ | 303/2 |
| 2012/0306259 A1 * | 12/2012 | Minato et al. | ........ | 303/6.01 |
| 2013/0304343 A1 * | 11/2013 | Feyerabend et al. | ........ | 701/70 |

OTHER PUBLICATIONS

International Search Report dated Jun. 25, 2012 w/ partial English translation (five (5) pages).

German Office Action dated Nov. 15, 2011 w/ English translation (eight (8) pages).

* cited by examiner

COMPRESSED-AIR SUPPLY DEVICE FOR COMMERCIAL VEHICLES

CROSS REFERENCE TO RELATED APPLICATIONS

This application is a continuation of PCT International Application No. PCT/EP2012/052575, filed Feb. 15, 2012, which claims priority under 35 U.S.C. §119 from German Patent Application No. DE 10 2011 011 634.6, filed Feb. 17, 2011, the entire disclosures of which are expressly incorporated by reference herein.

BACKGROUND AND SUMMARY OF THE INVENTION

The present invention relates to a compressed-air supply device for commercial vehicles In modern commercial vehicles, pneumatic systems such as compressed-air brakes are frequently used. In order to supply such pneumatic systems with compressed-air, compressed-air supply devices are employed which generally have an electronic control device. In order to be able to selectively actuate valves of the compressed-air supply device via the electronic control device, the valves are frequently embodied as solenoid valves. This makes it possible to carry out precise control of the compressed air made via a compressor and to regenerate the air filter. In order to ensure the compressed-air supply for such an important system as brakes in the event of failure of the electronic control device, for example as a result of a faulty power supply or because of failure of a sensor, a fall-back level is generally made available which functions even without an electronic control device. However, the possibility of selective actuation of the valves is then also eliminated. For example, without an electronic control device the compressor can no longer be placed in an energy saving mode if an operating pressure of the compressed-air supply device is reached. This can lead to a situation in which the compressor continues to work against a high pressure over a long time until a safety valve releases the pressure at a maximum pressure. This can lead to considerable loading of the compressor, which can even damage the compressor, for example due to overheating. When the electronic controller fails, it is generally no longer possible to regenerate the air filter. As a result there is a risk of the air filter and downstream consumer systems, in particular the brake systems, being operated under wet conditions.

An object of the present invention is to make available, in an electronically controlled compressed-air supply device, a fall-back level which permits improved operation, in particular of the compressor, and of the regeneration, in a purely pneumatic fashion.

According to the invention, a compressed-air supply device is provided for commercial vehicles, wherein the compressed-air supply device is or can be connected electrically to an electronic control device. The compressed-air supply device has at least one control valve which can be actuated via the electronic control device. The control valve has at least one inlet connection, one venting connection and one outlet connection. In addition, the compressed-air supply device has a control line which is connected to the outlet connection of the control valve, wherein the control line is or can be connected to a control inlet of a compressor and/or an inlet of a regeneration valve, as well as a supply line via which compressed air is or can be guided to the inlet connection of the control valve, and a venting line which is connected to the venting connection of the control valve, wherein the control valve can be vented via the venting line. The control valve is also embodied in such a way that when there is a predetermined opening pressure in the supply line, said control valve pneumatically brings about a fluid-conducting connection between the inlet connection and the outlet connection in such a way that the control line is ventilated. Bringing about a fluid-conducting connection between the inlet connection and the outlet connection on the basis of the opening pressure in the supply line can generally be referred to as pneumatically opening the control valve. In particular, it is possible to provide that the control valve is embodied in such a way that the fluid-conducting connection between the inlet connection and the outlet connection is brought about independently of the actuation by the electronic control device. It is therefore possible to bring about, via the control valve which is otherwise controlled via the electronic control device, a pressure buildup in the control line by purely pneumatic means if the pressure in the supply line reaches or exceeds the opening pressure. The actuation of the control valve by the electronic control device can be carried out in an indirectly or directly electrical fashion, for example by energizing electromagnetic components of the valve. The control valve can be embodied, in particular, as a solenoid valve. It is also conceivable for the control valve to have, in addition to a pneumatic valve, a solenoid valve component for performing pilot control of the pneumatic valve, which solenoid valve component is actuated by the electronic control device. The control valve can be embodied as a 3/2-way valve. In a normal position, the control valve can be switched in such a way that it connects the control line to the venting line, that is to say in such a way that there is a fluid-conducting connection between the outlet connection and the venting connection. The inlet connection and therefore the supply line can be shut off in the normal position. It is therefore possible for the control line to be vented or being capable of being vented in the normal position. In an on position, the control valve can be switched in such a way that said control valve connects the control line in a fluid-conducting fashion to the supply line and shuts off the venting line. As a result, the inlet connection and the outlet connection are connected to one another in a fluid-conducting fashion and the venting connection is shut off. The electronic control device can permit the control valve to be switched over between the normal position and the on position. It may be expedient to embody the control valve in such a way that it assumes the normal position if it is not actuated via the electronic control device and/or not energized. For this purpose, it is possible to provide, for example, a resetting device, such as a spring arrangement, which prestresses the control valve into the normal position. The control valve can be embodied in such a way that in or out of the normal position and/or when it is not energized it pneumatically opens given a predetermined opening pressure in the supply line, with the result that the control line is ventilated. It is conceivable that when the control valve pneumatically opens owing to the opening pressure in the supply line the control valve is not completely switched into the on position but instead assumes an intermediate position which is referred to as an open position. The pneumatic opening can therefore also be referred to as switching into the open position. It may be the case, for example, that in the open position the venting connection is not shut off or not shut off completely. The electronic control device can be considered to be part of the compressed-air supply device or be embodied so as to be separate therefrom. The compressed-air supply device can comprise the compressor or be considered to be a separate or separable device from the compressor. The control line can be connected or be capable of being connected, in particular, to a compressor control inlet via which the compressor can be actuated pneumatically. It is conceivable, for example, that when a pressure is present at the control inlet of the compressor, said compressor switches into an energy saving mode. In an energy saving mode, the compressor can, for example, be decoupled from a drive or a shaft, or switched off. If there is no pressure at the control inlet of the compressor, the compressor can be operated in such a way that it supplies compressed air for the compressed-air supply system. The supply line can be employed, in particular, to distribute compressed air to consumer systems such as, for example, brakes, an air suspension system, a trailer or the like. A regeneration valve may be a valve via which regeneration of an air filter of the compressed-air supply system takes place and/or is controlled. In particular, a nonreturn valve in a regeneration line can be considered to be a regeneration valve. The air filter may be part of the compressed-air supply system. It is conceivable, in particular, that the compressed-air preparation device has a second control valve, which is embodied in a way analogous to the control valve and has a predetermined, second opening pressure. The second control valve can generally have the properties and features mentioned for the control valve.

The second opening pressure can correspond to the first opening pressure or be the same as said pressure. It can be expedient if the second opening pressure differs from the first opening pressure. In particular it is possible to provide that an inlet connection, referred to as a second inlet connection, of the second control valve is or can be connected to the control line, which in this case then acts as a supply line for the second control valve. In this context, the second control valve can be, in particular, a regeneration valve. As a result, the second control valve can be switched pneumatically into its open position if the control valve is in the open position. It may be advantageous if a first control valve is or can be connected via its control line to a compressor control inlet and to the second inlet connection of a second control valve which is employed as a regeneration valve. Within the scope of this description, a connection or fluid-conducting connection between two pneumatic components or a line and a pneumatic component such as a valve constitutes a pneumatic connection, with the result that compressed air can be guided via the connection. A commercial vehicle may be, in particular, a truck or a mobile implement, such as, for example, a tractor. A rail vehicle can also be considered to be a commercial vehicle. Generally, it may be expedient if the predetermined opening pressure and/or, if appropriate, the second opening pressure is higher than an operating pressure of the compressed-air supply device. The operating pressure can be predefined and/or monitored by the electronic control device. For example, the electronic control device can be designed to stop the compressed-air supply, for example by switching the compressor into its energy saving mode, when the operating pressure is reached. It is possible to provide that the electronic control device senses the pressure in the compressed-air supply device at one or more locations by means of suitable sensors, and switches off or disconnects the compressor when the desired operating pressure is reached. For this purpose, a suitable solenoid valve can be actuated in order to input a pressure signal into the compressor control line. The solenoid valve can be considered to be a control valve as described above. An operating pressure may be, for example, approximately 12 or 12.5 bar. The operating pressure may be determined, in particular, in the supply line. For example, the opening pressure can be between 13 bar and 14 bar, for example 13 bar, 13.5 bar or 14 bar. In order to protect the compressed-air supply device it is possible to provide a maximum safety pressure which the device must not exceed under any circumstances. In order to prevent this safety pressure from being exceeded, a safety valve can be used which, in the event of the safety pressure being exceeded, brings about venting to the atmosphere. The opening pressure and/or, if appropriate, the second opening pressure are/is expediently below this safety pressure. As a result, the opening pressure of a control valve can be between the operating pressure and the safety pressure. It is also conceivable that the conventional safety valve is replaced by the control valve. This is because it is possible to ensure pneumatically that the opening pressure is not exceeded if the control line which is coupled to the described control valve is connected for switching the compressor and/or for discharging pressure, for example to a means for venting to the atmosphere or a discharge valve for a venting means, or by initiating a regeneration process. In this case, the opening pressure can therefore be considered to be a safety pressure. In the scope of this description it is also possible for the minimum flow cross section to be considered in each case as an effective flow cross section in a line, connection or in a valve, said minimum flow cross section, in the case of the flow under consideration, plays a role which is relevant to the flow. The opening pressure of a control valve can be set by suitably configuring the valve, for example by correspondingly setting a spring arrangement.

The compressed-air supply device can be embodied in such a way that a venting flow cross section which has the function of venting the control valve is smaller than a control flow cross section which has the function of ventilating the control line via the control valve. It is therefore possible to ensure that even when the control valve is in an intermediate position through pneumatic actuation via the supply line, a pressure buildup can reliably take place in the control line in that the venting connection, inlet connection and outlet connection are connected to one another in a fluid-conducting fashion. Generally, the flow cross sections which are effective for certain flows in the associated valve and/or in associated lines can be set or defined. During the setting of the flow cross sections it is generally possible to take into account the opening pressure and its effects on the cleared opening of the outlet connection and venting connection.

In one development it is possible to provide that a supply flow cross section which has the function of guiding compressed air into the control valve via the supply line and the inlet connection is larger than a venting flow cross section which has the function of venting the control valve and/or than a control flow cross section which has the function of ventilating the control line via the control valve. As a result, a sufficient amount of compressed air can be fed via the supply line to prevent excessive venting via the venting connection and the venting line. Sufficiently large pressure buildup can also be achieved by ventilating the control line. The flow cross section which is effective for the supply of air via the inlet connection can be made as large as or larger than the sum of the flow cross sections which have the function of performing ventilation via the venting connection and the pressure buildup via the outlet connection.

In particular, a restrictor, which can define a minimum flow cross section for venting via the venting connection, can be provided in the venting line. As a result, a suitable effective venting flow cross section can be defined easily without having to make a change to a conventional control valve.

It is possible to provide that a flow cross section of the venting connection which has the function of venting the control valve is smaller than the flow cross section of the control connection which has the function of ventilating the control line via the control valve. In this way it is possible to ensure that the desired flow conditions are already defined by the control valve independently of a routing of a line.

It is conceivable that a flow cross section, which has the function of guiding compressed air into the control valve, of the inlet connection is larger than a flow cross section, which has the function of venting the control valve, of the venting connection and/or a flow cross section, which has the function of ventilating the control line via the control valve, of the outlet connection. It is therefore possible to ensure simply by suitable dimensioning of the connections of the control valve that a pressure buildup in the control line is possible in the fall-back mode. The flow cross section which has the function of supplying air via the inlet connection can be made as large as or larger than the sum of the flow cross section, which has the function of venting, of the venting connection and the flow cross section, which has the function of building up pressure, of the outlet connection.

In the control line it is also possible to provide a quick-acting venting valve. Such a quick-acting venting valve can permit, in particular, more rapid venting of the control line than would be possible via the control valve. In this context, it is possible to provide that venting via the quick-acting venting valve is triggered by switching the control valve from the open position into the normal position, during which switching a fluid-conducting connection is brought about between the inlet connection and the venting connection of the control valve and/or the connection between the inlet connection and the outlet connection is interrupted. Generally, a quick-acting venting valve can be a 3/2-way valve. A valve can generally be considered to be a quick-acting venting valve which has an inlet connection, an outlet connection and a venting connection. In the case of a quick-acting venting valve the outlet connection can be vented via the venting connection when the inlet connection is vented. If the inlet connection is ventilated, the quick-acting venting valve can connect the outlet connection to the inlet connection and shut off the venting connection.

It may be expedient if a flow cross section, which has the function of venting the control line via the quick-acting venting valve, is larger than a flow cross section, which has the function of venting the control valve via the venting line. This ensures that rapid venting can take place via the quick-acting venting valve.

The control valve can be embodied in such a way that when there is a predetermined closing pressure in the supply line, said control valve interrupts a fluid-conducting connection between the inlet connection and the outlet connection is brought about. In particular it is possible to provide that in the case of a drop in the pressure in the supply line as far as the closing pressure this fluid-conducting connection is interrupted after the control valve has pneumatically opened. The control valve can therefore switch pneumatically from the open position into another position, preferably into the normal position, as a function of the pressure in the supply line. The interruption of the connection between the inlet connection and the outlet connection can occur, in particular, when the control valve is in the currentless state or actuation by the electronic control device does not take place. Generally, the closing pressure of a control valve can be set by a suitable configuration of the valve, for example by a spring arrangement being correspondingly set.

It is conceivable that the control valve is embodied in such a way that, when a predetermined closing pressure in the supply line is undershot, said control valve brings about a fluid-conducting connection between the outlet connection and the venting connection. It is therefore possible for venting of the control line to take place or to be initiated via the control valve.

The closing pressure can be lower than the opening pressure. In this context, the control valve can, in particular, be set in such a way that it has a hysteresis. It is therefore possible to define a pressure range in which the control valve is pneumatically opened in order to relieve the compressor for as long as possible. The closing pressure can be below the operating pressure or approximately in the region of the operating pressure.

Of course, the specified features for a control valve can also analogously apply to a second control valve which is possibly present and which has a second opening pressure.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
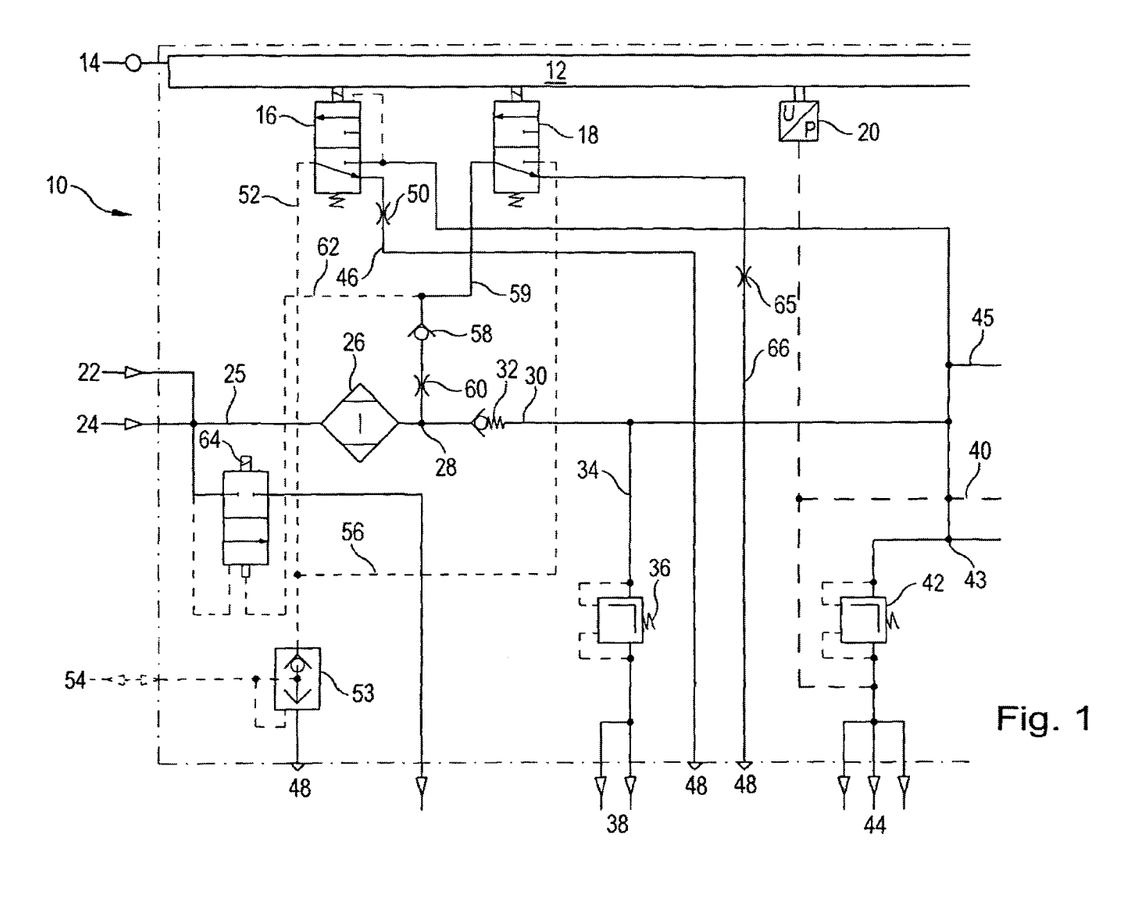
FIG. 1 shows a schematic partial illustration of a compressed-air supply device in accordance with an embodiment of the present invention.

In FIG. 1, continuous lines and lines shown by short dashes represent compressed-air connections, while long dashes represent electrical signal lines.

FIG. 1 is a schematic illustration of part of an embodiment of a compressed-air supply device 10. The compressed-air preparation device 10 comprises an electronic control device 12. The latter is or can be connected to vehicle electronics via a central plug 14. The electronic control device 12 is designed to actuate electrically, for example, a first solenoid valve 16 and a second solenoid valve 18. A pressure sensor 20 can pass on a pressure signal to the electronic control device 12, which pressure signal specifies, in this example, the pressure in a consumer system downstream of an overflow valve described further below. The compressed-air supply device 10 has a compressor connection or compressed-air inlet 22 via which compressed air can be made available by a compressor. The compressed-air supply device 10, or loads connected thereto, can be filled from the outside via an external connection or compressed-air inlet 24 while bypassing the compressor. The two inlets 22, 24 are connected via an inlet line 25 to an air filter 26 which serves to filter out impurities from air fed to the compressed-air supply device, these being, for example, water or oil. Downstream of the air filter 26, a connecting line 28 to a supply line 30 is provided, said connecting line 28 feeding, or being able to feed, compressed air cleaned by the air filter 26 to an inlet connection of the first solenoid valve 16. In order to protect the supply line 30 against pressure loss, a nonreturn valve 32 is provided between the connecting line 28 and the supply line 30. The nonreturn valve is arranged downstream of the air filter 26 with respect to the supply line 30 in such a way that air cannot flow back to the air filter 26 via the supply line 30. Downstream of the nonreturn valve 32, a compressed-air line 34 branches off from the supply line 30. In this example, the pressure line 34 leads via a first overflow valve 36 to connections 38 for supplying an air spring system (not shown).

Downstream of the compressed-air supply line 34, a further compressed-air supply line 40 branches off from the supply line 30. The latter leads in this example via a branch 43 to a second overflow valve 42 and on to connections 44 for supplying a first brake circuit (not shown). A second branch (not denoted in more detail) leads from the branch 43 via an overflow valve (not shown) to a further consumer, for example a second brake circuit. Similarly, further compressed-air consumers can be supplied by the supply line 30 via a further branch 45, these being, for example, trailer brakes, a parking brake or similarly known consumer devices of a commercial vehicle. The sensor device 20 is provided for monitoring the pressure downstream of the overflow valve 42 and downstream of further overflow valves (not shown).

The supply line 30 is also connected to an inlet connection of the first solenoid valve 16. A venting outlet of the first solenoid valve 16 is connected to a venting line 46 which is connected to a venting means 48. The venting means 48 vents the venting line 46 to the atmosphere. In this example, a restrictor 50 is provided in the venting line 46. A control line 52 is connected to an outlet connection of the first solenoid valve 16. The first solenoid valve is embodied as a 3/2-way valve. In this example, the control line 52 leads via a quick-acting venting valve 53 to a control inlet 54 of a compressor (not shown). There is provision that when the control line 52 is ventilated, that is to say a pressure above the atmospheric pressure is present in it via the supply line 30, the compressor is switched to an energy saving mode, for example by it being decoupled or entirely switched off or its delivery current being greatly reduced. A regeneration control line 56 branches off from the control line 52, said regeneration control line 56 being connected to an inlet connection of the second solenoid valve 18 and acting as a supply line which is connected to the second solenoid valve 18. A venting connection of the second solenoid valve 18 is connected via a venting line 66 to a venting means 48. An outlet connection of the second solenoid valve 18 is connected via a regeneration line 59 to the connecting line 28 between the air filter 26 and the nonreturn valve 32. A regeneration nonreturn valve 58 and a regeneration restrictor 60 are connected one behind the other into the regeneration line 59. The regeneration line 59 can be considered to be a control line connected to the second solenoid valve 18. In addition, the second solenoid valve 18 and the regeneration nonreturn valve 58 can each be considered to be a regeneration valve. In the case of regeneration being carried out, the regeneration nonreturn valve 58 prevents air provided for the regeneration from flowing back in the direction of the second solenoid valve 18 into the line 59. A flow which is suitable for the regeneration is set by the regeneration restrictor 60. A switch-off valve control line 62 branches off from the regeneration line 59 between the regeneration nonreturn valve 58 and the second solenoid valve 18. The discharge control line 62 leads to a discharge valve 64. The discharge valve 64 can be embodied as a 2/2-way valve. In the normal state, when a pressure signal does not actuate the discharge valve 64 via the discharge control line 62, the discharge valve 64 blocks a connecting line between the inlet line 25 and a venting means 48 for venting to the atmosphere. If a pressure signal is fed to the discharge valve 64 via the discharge control line 62, said discharge valve 64 switches into its on position, in which it connects the inlet line 25 to the venting means 48 in a fluid-conducting fashion. Such a connection is brought about by the discharge valve 64 even if the pressure in the inlet line 25 or in the compressed-air supply device 10 exceeds a predetermined safety pressure, which can be approximately 14 bar or 15 bar. The air filter 26 can be regenerated via the discharge valve 64 in that a venting possibility for air originating from the regeneration line 59 and flowing through the air filter 26 is provided. As is apparent in FIG. 1, the supply line 30 or the line or supply pressure present therein also has a control function for the first solenoid valve 16. The latter is set, in fact, in such a way that when a certain predetermined opening pressure is reached or exceeded in the supply line 30, the first solenoid valve 16 is placed pneumatically in an open state, which is described in more detail below. The abovementioned venting means 48 can be separate outlets to the atmosphere or be combined to form one or more outlets.

During operation, the compressed-air supply device 10 is supplied with compressed air via the compressor. Compressed air flows via the inlet line 25 and into the supply line 30 through the air filter 26 and the connecting line 28 as well as the nonreturn valve 32. Via said supply line 30, said compressed air can be distributed to the consumer systems via overflow valves, for example the overflow valves 36 and 42, and the branches 43, 44. At the same time, the pressure in the supply line 30 is present at the inlet connection of the first solenoid valve 16. The first solenoid valve 16 and the second solenoid valve 18 are each in a normal position when currentless, that is to say when they are not actuated by the electronic control device 12. In the normal position, the outlet connection of a solenoid valve 16, 18 is connected in each case in the valve to the venting outlet of the same solenoid valve 16, 18, while the inlet connection is shut off. In the currentless state shown, the outlet connection, connected to the control line 52, of the first solenoid valve 16 is therefore connected to the venting connection which is connected to the venting means 48 via the restrictor 50 and the venting line 46. In the currentless state shown, the second solenoid valve 18 is switched in such a way that the regeneration line 59 is connected to the venting connection of the second solenoid valve 18 and therefore to the venting means 48. In the energized state, the first solenoid valve 16 and the second solenoid valve 18 are switched to the on position. In the on position, in each case the inlet connection and the outlet connection are connected to one another in a fluid-conducting fashion, while the venting connection is shut off. In the on position, the outlet connection, connected to the control line 52 of the first solenoid valve 16 is therefore connected in a fluid-conducting fashion to the inlet connection which is connected to the supply line 30. In the on position, the second solenoid valve 18 is connected in such a way that the regeneration control line 56 is connected in a fluid-conducting fashion via the inlet connection of the second solenoid valve 18 and via the outlet connection of the second solenoid valve 18 to the regeneration line 59. If the pressure within the compressed-air supply device 10 reaches a certain predefined operating pressure, which may be, for example, approximately 12.5 bar, the electronic control device 12 switches the compressor off. For this purpose, the first solenoid valve 16 is switched to its on position, with the result that the control line 52 is ventilated via the supply line 30, and the high operating pressure is therefore present. The pressure on the control line 52 is passed on, on the one hand, to the compressor via the quick-acting venting valve 53 and the connection 54, which compressor then switches into its energy saving state. Furthermore, the pressure in the control line 52 is also present at the inlet connection of the second solenoid valve 18. If the second solenoid valve 18 is then switched into its on position by the electronic control device 12, compressed air can flow from the supply line 30 into the regeneration line 59 via the first solenoid valve 16, the control line 52, the regeneration control line 56 and the second solenoid valve 18. Therefore, on the one hand, the discharge valve 64 is switched into its on position via the discharge control line 62. On the other hand, compressed air can flow to the one inlet connection of the discharge valve 64 via the regeneration nonreturn valve 58, the regeneration restrictor 60 and the air filter 26. Via said discharge valve 64 a connection is made to the venting means 48, with the result that compressed air can flow through the air filter 26 counter to the conventional flow direction, in order to regenerate said air filter 26. As a result, the electronic control device 12 can actuate an energy saving mode for the compressor by actuating the first solenoid valve 16. In addition, by actuating the second solenoid valve 18 the air filter 26 can be regenerated. If the first solenoid valve 16 is switched back into its normal position, the control line 52 is connected to the venting line 46. Air therefore flows out of the control line 52. As a result, the quick-acting venting valve 53 is switched in such a way that it connects and vents the compressor control inlet 54 to the venting means 48. The line is therefore vented from the quick-acting venting valve 53 to the compressor via the relatively large flow cross section of the quick-acting venting valve 53. A rapid drop in pressure is therefore achieved in the line to the compressor, as a result of which the compressor is quickly placed in its operating state. In addition, no further pressure is subsequently supplied to the second solenoid valve 18 via the supply line 30, as a result of which the regeneration is stopped. Furthermore, the second solenoid valve 18 is expediently placed in its currentless state, as a result of which the regeneration line 59 and the discharge control line 62 are also vented. The discharge valve 64 therefore blocks the connection to the venting means. If the electronic control device 12 were then to fail, the compressor would allow the pressure in the compressed-air supply device 10 to rise to the safety pressure, after which the discharge valve 64 opens. In this context the compressor must perform considerable work counter to a high pressure prevailing in the compressed-air supply device 10, as a result of which the compressor is heavily loaded and experiences a risk of overheating. In order to avoid this, there is provision that the first solenoid valve 16 is able to open pneumatically in the event of an opening pressure in the supply line 30 which is below the safety pressure, even if there is no electronic control signal present. In this context, there is, in particular, provision that the first solenoid valve 16 is set in such a way that it opens pneumatically in the event of a pressure in the supply line 30 which is between the normal operating pressure, that is to say approximately 12.5 bar, and a maximum permitted pressure, that is to say approximately the safety pressure of approximately 15 bar. Therefore, if a corresponding opening pressure is present via the supply line 30, the solenoid valve 16 is placed in a state in which a fluid-conducting connection is present between the inlet connection and the outlet connection of the first solenoid valve 16. In this example there is provision that only seeping venting can take place via the restrictor 50, with the result that ventilation of the control line 52 takes place in all cases even in an intermediate position in which the first solenoid valve 16 is not completely switched to the on position. The restrictor 50 defines a minimum flow cross section for the venting of the venting connection via the line 46, which flow connection is smaller than a minimum flow cross section which has the function of supplying compressed air to the control line 52. As a result, even in the currentless state the pressure built up in the control line 52 causes the compressor to switch into the energy saving mode. In the example shown here there is provision that only the first solenoid valve 16 is configured as such a pneumatically opening control valve, while the second solenoid valve 18 is not moved out of its normal state even when there is a very high pressure in the regeneration control line 56 connected to the control line 52. However, it is also conceivable for the second solenoid valve 18 to be embodied in such a way that when a second opening pressure, as described above, is applied, the second solenoid valve 18 switches into an open position, with the result that regeneration can take place without corresponding control by the electronic control device 12 if the compressor is switched to its energy saving mode. For this purpose, a restrictor 65 can optionally be provided in the venting line 66 connected to the venting outlet of the second solenoid valve 18. The flow cross section of the restrictor 65 can be embodied in such a way that in an intermediate position of the second solenoid valve 18 the flow cross section which has the function of bringing about a flow via the outlet connection of the second solenoid valve 18 is larger than the flow cross section of the restrictor 65, which flow cross section has the function of venting the solenoid valve 18. As a result it is possible to ensure a sufficient air stream for the regeneration, which air stream can therefore be, in particular, larger than the air stream escaping via the venting line 66. Of course, in an analogous fashion the flow cross section of the venting connection of the second solenoid valve 18 can be of corresponding design in order to define the desired flow conditions.

Figure 2:
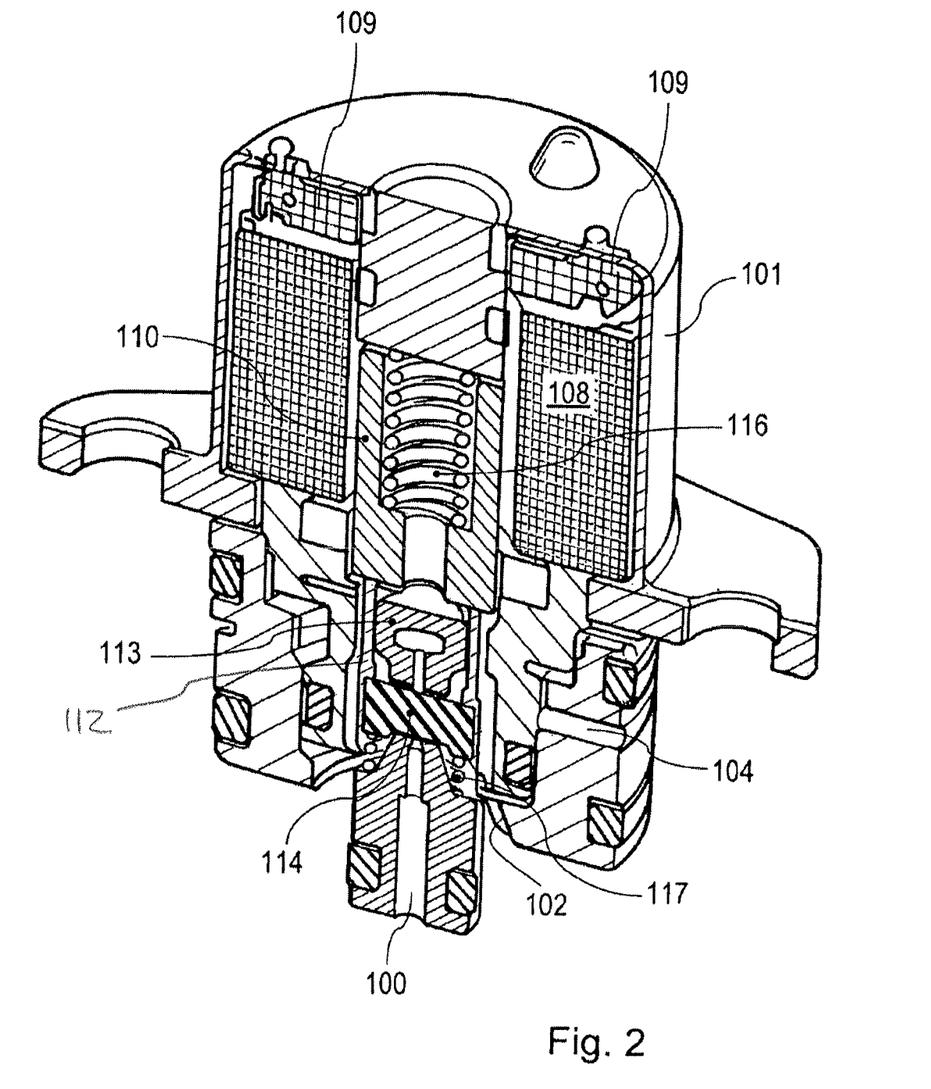
FIG. 2 shows a sectional view of a solenoid valve in accordance with an embodiment of the present invention.

FIG. 2 shows an example of a solenoid valve which can be used, for example as a first solenoid valve in FIG. 1. The solenoid valve has a housing 101, an inlet connection 100, an outlet connection 102 and a venting connection 104. The inlet connection 100 can, for example, be connected to a supply line 30 as described in FIG. 1. In addition, the solenoid valve has, as a central component, a coil 108, an armature 110 and an activation element 112. The activation element 112 surrounds in this case a sealing rubber element 114. In addition, a spring 116 is provided which prestresses the armature 110 against the activation element 112. A relatively small spring 117 acts in the opposite direction on the rubber sealing element 114, that is to say in the direction of the coil 108. If the coil 108 is not energized via coil connections 109, the spring 116 presses on the armature 110 and the activation element 112, as a result of which the sealing rubber element 114 shuts off a connection between the inlet connection 100 and the outlet connection 102. In this case, there is a connection between the outlet connection 102 and the venting connection 104. This position corresponds to the normal position. If the coil 108 is then energized, the armature 110 is attracted counter to the effect of the spring 116, with the result that the prestress on the activation element 112 is cancelled. The spring 117 and a pressure which is possibly present at the inlet connection 100 move the sealing rubber element 114 with the activation element 112 likewise in the direction of the coil 108 until they come to a stop against a stop element 113, with the result that a fluid-conducting connection is produced between the inlet connection 100 and the outlet connection 102. At the same time, the venting connection 104 is shut off. This corresponds to the on position. However, even if the coil 108 is not energized, a case can occur in which a fluid-conducting connection is formed between the inlet connection 100 and the outlet connection 102. If, specifically, there is a sufficiently high pressure at the inlet connection 100, which pressure acts via the sealing element 114 on the activation element 112 in such a way that the armature 110 can be pressed upward counter to the spring force 116, the sealing rubber element 114 can lift off from the inlet connection 100 in order to open the valve pneumatically. As a result, a fluid-conducting connection can be made possible between the inlet connection 100 and the outlet connection 102. If the opening pressure is sufficiently large that it completely overcomes the force of the spring and drives the armature 110 against its upper stop point, the venting connection 104 is also shut off. If the opening pressure at the inlet connection is, however, not sufficiently large to shut off the venting means, a fluid-conducting connection is brought about between the inlet connection 100 and the outlet connection 102, but venting is also possible via the venting outlet 104. In order to ensure that a pressure buildup can take place in a control line such as the control line 52 via the outlet connection 102 which is preferably connected to said control line, it should be accordingly ensured that a flow can take place via the outlet connection 102 which is greater than a flow via the venting connection 104. For this purpose, it is possible, for example, for the flow cross section provided for a flow via the venting connection 104 to be made smaller within the solenoid valve than the flow cross section which has the function of ensuring a flow via the outlet connection 102. Alternatively or additionally, a corresponding restrictor can also be provided downstream of the venting connection, this being, for example, the restrictor 50 described above. Furthermore, the flow cross section which has the function of guiding compressed air into the solenoid valve, at the inlet connection 100, can be made sufficiently large that overall a sufficient flow of compressed air is produced. In particular, this flow cross section can be larger than the flow cross section which has the function of ensuring venting, and the flow cross section which has the function of ensuring the flow via the outlet connection 102. It is possible to provide that the flow cross section for the supply of air is via the inlet connection 100 as large as or larger than the sum of the flow cross sections which have the function of ensuring venting and the pressure buildup via the outlet connection 102, in the valve.

The features of the invention which are disclosed in the present description, in the drawings and in the claims can be essential, either individually or in any desired combination, to the implementation of the invention.

LIST OF REFERENCE NUMBERS

10 Compressed-air supply device
12 Electronic control device
14 Central plug
16 First solenoid valve
18 Second solenoid valve
20 Sensor device
22 Compressor connection
24 External compressed-air connection
26 Air filter
28 Connecting line
30 Supply line
32 Nonreturn valve
34 Compressed-air supply line
36 Rollover safety valve
38 Supply connections
40 Second compressed-air supply line
42 Overflow valve
43 Branch
44 Consumer connections
45 Branch
46 Venting line
48 Venting means
50 Restrictor
52 Control line
53 Quick-acting venting valve
54 Compressor control connection
56 Regeneration control line
58 Regeneration nonreturn valve
59 Regeneration line
60 Regeneration restrictor
62 Discharge valve control line
64 Discharge valve
65 Restrictor
66 Venting line
100 Inlet connection
101 Housing
102 Outlet connection
104 Venting connection
108 Coil
109 Coil connections
110 Armature
112 Activation element
113 Stop element
114 Sealing rubber element
116 Spring
117 Small spring The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A compressed-air supply device for commercial vehicles which is electrically connectable to an electronic control device, comprising:
    at least one control valve actuable by the electronic control device, the control valve having at least one inlet connection, one venting connection and one outlet connection;
    a control line connected to the control valve outlet connection, the control line being connected to at least one of a control inlet of a compressor and an inlet of a regeneration valve;
    a supply line arranged to supply compressed air to the control valve inlet connection;
    a venting line arranged to vent the control valve from the control valve venting connection;
    wherein the control valve is configured to establish a fluid-conducting connection between the control valve inlet connection and the control valve outlet connection using pressure in the supply line when a predetermined opening pressure is exceeded in the supply line.

2. The compressed-air supply device as claimed in claim 1, wherein an effective venting flow cross section in a flow path of venting the control valve via the venting line is smaller than an effective control flow cross section in a flow path from the control valve via the control line.

3. The compressed-air supply device as claimed in claim 2, wherein an effective supply flow cross section in a flow path guiding compressed air into the control valve via the supply line and the inlet connection is larger than at least one of the effective venting flow cross section and the effective control flow cross section.

4. The compressed-air supply device as claimed in claim 3, wherein a restrictor is provided in the venting line.

5. The compressed-air supply device as claimed in claim 4, wherein an effective flow cross section of the outlet connection of the control valve is smaller than the effective control flow cross section.

6. The compressed-air supply device as claimed in claim 5, an effective flow cross section of the inlet connection of the control valve is larger than at least one of an effective flow cross section of the venting connection of the control valve and the effective flow cross section of the outlet connection of the control valve.

7. The compressed-air supply device as claimed in claim 1, wherein a quick-acting venting valve is provided in the control line.

8. The compressed-air supply device as claimed in claim 7, wherein an effective flow cross section of the quick-acting venting valve is larger than an effective venting flow cross section in the flow path of venting the control valve via the venting line from the control valve.

9. The compressed-air supply device as claimed in claim 1, wherein the control valve is configured such that when a pressure in the supply line falls below a predetermined closing pressure, the control valve interrupts a fluid-conducting connection between the outlet connection and the inlet connection.

10. The compressed-air supply device as claimed in claim 6, wherein the control valve is configured such that when a pressure in the supply line falls below a predetermined closing pressure, the control valve interrupts a fluid-conducting connection between the outlet connection and the inlet connection.

11. The compressed-air supply device as claimed in claim 8, wherein the control valve is configured such that when a pressure in the supply line falls below a predetermined closing pressure, the control valve interrupts a fluid-conducting connection between the outlet connection and the inlet connection.

12. The compressed-air supply device as claimed in claim 1, wherein the control valve is configured such that when a pressure in the supply line falls below a predetermined closing pressure, the control valve brings about a fluid-conducting connection between the outlet connection and the venting connection.

13. The compressed-air supply device as claimed in claim 6, wherein the control valve is configured such that when a pressure in the supply line falls below a predetermined closing pressure, the control valve brings about a fluid-conducting connection between the outlet connection and the venting connection.

14. The compressed-air supply device as claimed in claim 8, wherein the control valve is configured such that when a pressure in the supply line falls below a predetermined closing pressure, the control valve brings about a fluid-conducting connection between the outlet connection and the venting connection.

15. The compressed-air supply device as claimed in claim 9, wherein the closing pressure is lower than the opening pressure.

16. The compressed-air supply device as claimed in claim 12, wherein the closing pressure is lower than the opening pressure.

* * * * *